United States Patent Office 2,777,862
Patented Jan. 15, 1957

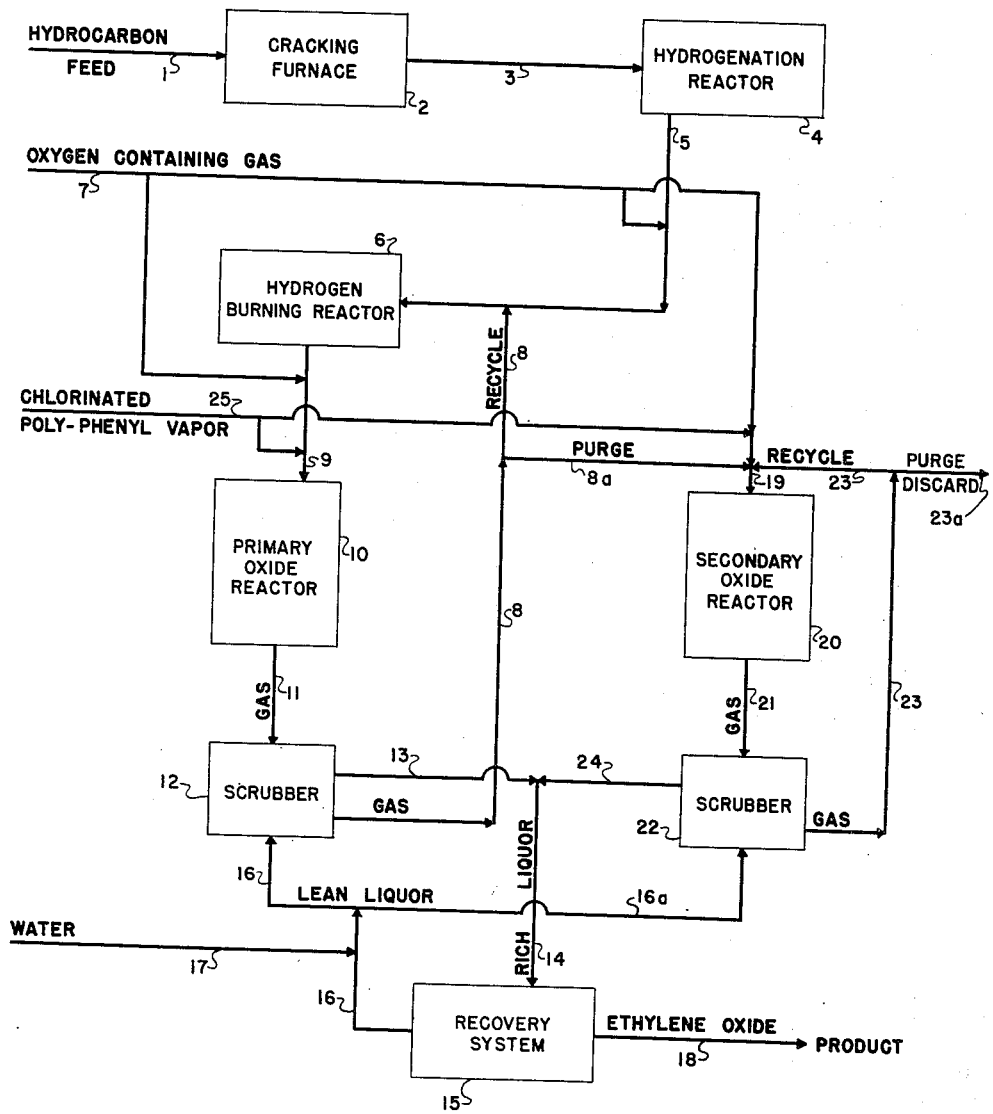

2,777,862
PROCESS FOR THE CATALYTIC OXIDATION OF OLEFINS

Robert B. Egbert, Roslyn Heights, N. Y., assignor to Chempatents, Inc., New York, N. Y., a corporation of Delaware Application December 11, 1953, Serial No. 397,556

3 Claims. (Cl. 260—348.5)

This invention relates to a process for the preparation of ethylene oxide, by the selective partial oxidation of the ethylene in a gaseous mixture comprising about 3 to 12% by volume oxygen, 1 to 25% ethylene, 0.2 to 17% hydrogen, and inert gases, by first selectively catalytically oxidizing the hydrogen gas to produce a relatively hydrogen-free gaseous mixture, and then catalytically converting ethylene therein to ethylene oxide in the presence of an active silver catalyst at a temperature in the range of about 240 to 350° C., and recovering ethylene oxide therefrom.

The invention also relates to such a process wherein the substantially hydrogen-free gaseous mixture containing 4.5 to 6.5% by volume of ethylene and 5.5 to 8% oxygen is reacted in the presence of a first silver containing catalyst to form a gaseous mixture containing 2.5 to 4.5% ethylene and 0.8 to 1.2% ethylene oxide, the latter is removed, and the remaining gas is recycled (after a portion thereof is purged) to the make up of the said first feed gaseous mixture, the purged gas is used to make up a second feed gaseous mixture containing 1.5 to 2.0% ethylene and 5.5 to 8% oxygen and this is passed over a second silver containing catalyst to form a gaseous mixture containing 0.3 to 0.6% ethylene and 0.5 to 1.0% ethylene oxide, the latter is removed, and the remaining gas is recycled (after a portion thereof is purged and discarded) to make up the second feed gaseous mixture.

The preparation of ethylene oxide by the catalytic oxidation of ethylene is known, and such processes have achieved noteworthy commercial success. Generally, these processes employ relatively pure ethylene which is free of hydrogen and of acetylene. Such pure ethylene is obtained by a rather expensive purification procedure.

On the other hand, the use of crude or impure ethylene has heretofore been disadvantageous from the operational viewpoint, especially as to control of the reaction to avoid excessive formation of carbon dioxide and water, with undesirably low yields of ethylene oxide.

The art is confronted with the problem of providing a commercially advantageous method for preparing ethylene oxide substantially directly from crude ethylene feed stocks.

It has been found in accordance with the invention that by means of a combination process wherein any acetylene in the crude ethylene stock is removed by catalytic hydrogenation in known manner, and then the hydrogen gas therein is selectively catalytically oxidized with gaseous oxygen to produce an ethylene feed stock which is substantially hydrogen-free, and then converting ethylene therein to ethylene oxide in the presence of a silver catalyst, desirable yields of ethylene oxide are obtained.

The objects achieved in accordance with the invention as described herein include the provision of a process for preparing ethylene oxide from crude ethylene feed stocks by removing any acetylene therein by selective catalytic hydrogenation, then selectively catalytically oxidizing the free hydrogen therein, and then converting ethylene therein to ethylene oxide in the presence of a silver catalyst and then recovering ethylene oxide, the provision of such a process wherein the substantially hydrogen-free gaseous mixture contains about 4.5 to 6.5% ethylene and 5.5 to 8% oxygen and is reacted in the presence of a silver containing catalyst to form a gaseous mixture containing 2.5 to 4.5% ethylene and 0.8 to 1.2% ethylene oxide, followed by recovering the latter and recycling the remaining gas (after purging a portion thereof) to make up the mixture fed to the step of catalytically oxidizing the hydrogen, and the purged gas is used to make up a second feed gaseous mixture containing 1.5 to 2% ethylene and 5.5 to 8% oxygen and is passed over another silver containing catalyst to form a gaseous mixture containing 0.3 to 0.6% ethylene and 0.5 to 1.0% ethylene oxide, recovering the latter, and recycling the remaining gas (after purging and discarding a portion thereof) to make up the latter feed gaseous mixture; the provision of such a process wherein the ethylene feed stocks contain an amount of gaseous paraffinic hydrocarbons which unduly lower the selectivity of the ethylene oxide formation steps, and a small proportion of a chlorinated poly-phenyl vapor is added to the mixture to counteract this selectivity lowering effect; and other objects which will be apparent as details or embodiments of the invention are set forth hereinafter.

In order to facilitate a clear understanding of the invention, the following preferred specific embodiments are described in detail.

Example 1

An ethane cracking gas feed stock is fed into a cracking furnace of the usual type under conditions to produce a relatively high proportion of ethylene together with hydrogen and a small amount of acetylene, in known manner. The cracked gas is passed through a hydrogenation reactor of known type to selectively hydrogenate any acetylene therein (e. g., with a nickel catalyst), and the remaining gas is then fed to a series of three oxidation reactors.

Each of these oxidation reactors contains a plurality of substantially vertical stainless steel tubes of about 1 inch diameter and about 16 to 25 feet in height, surrounded by a temperature regulating bath, such as diphenyl ether, or a hydrogenated or partially hydrogenated aromatic material or the like, and filled with a silver containing catalyst.

This silver catalyst is prepared by mixing an aqueous solution of silver nitrate with a slight stoichiometric excess of aqueous sodium hydroxide, settling, and thoroughly washing the silver oxide precipitate. If desired, an aqueous solution of barium lactate or calcium lactate is added thereto, to provide about 5 to 6% of barium or calcium relative to the atoms of silver therein. Approximately ⅜ inch spheres of mullite having a roughened outer surface and a substantially non-porous core, and freshly washed with water, are then added to the above mixture. The resulting mixture is evaporated slowly, with slow stirring, until each sphere is well coated with the slurry. Then the coated spheres are dried, e. g., at about 105–110° C. for about 4 to 10 hours, and then roasted at about 330 to 400° C. for about 1 to 5 hours.

The accompanying drawing is a diagrammatic illustration of the process.

Referring thereto, a hydrocarbon feed gaseous mixture is passed via line 1 into cracking furnace 2 wherein it is cracked in known manner to provide a mixture comprising ethylene and hydrogen and possibly some acetylene,, which mixture is passed via line 3 to hydrogenation reactor 4 wherein any acetylene present is hydrogenated in known manner; then the mixture is passed via line 5 to hydrogen burning reactor 6 together with oxygen containing gas and recycle gases fed into line 5 from lines 7 and 8.

The hydrogen gas is substantially all converted to water in the reactor.

The resulting mixture is then passed via line 9 to primary oxide reactor 10 wherein a part of the ethylene is converted to ethylene oxide, and the resulting gaseous mixture is passed via line 11 to scrubber 12 wherein it is contacted with lean aqueous liquor, introduced through line 16, to remove the ethylene oxide therefrom. The spent gas is recycled therefrom via line 8 to reactor 6, a part thereof being purged via line 8a. The rich liquor is passed via lines 13 and 14 to recovery system 15 wherein the ethylene oxide is separated and removed as product via line 18, e. g., to storage. The resulting lean liquor is returned to the scrubber via line 16; additional water may be added via line 17, if necessary.

The purged gas from line 8a may be discarded, or it may be blended with oxygen containing gas introduced through line 7, if necessary, and with recycle gas from line 23 and passed via line 19 into the secondary oxide reactor 20 wherein ethylene therein is converted to ethylene oxide, and the resulting gaseous mixture is passed via line 21 to scrubber 22 wherein it is contacted with lean aqueous liquor introduced through line 16a to remove the ethylene oxide therefrom. The spent gas is recycled via line 23 to the reactor 20, a part thereof being purged therefrom via line 23a and discarded. The rich liquor is passed from scrubber 22 via lines 24 and 14 to the recovery system 15 for separation of the ethylene oxide as already described.

If desired a small amount of halogen containing inhibitor, such as a chlorinated poly-phenyl vapor, may be introduced via line 25 into either lines 9 or 19 or both.

The term "residence time" is defined as the time required for a volume of gas equal to the volume of the empty reactor tube to pass therethrough, the gas volume being measured at the reaction temperature and pressure conditions, in accordance with accepted usage.

One suitable feed stock is the gaseous stream resulting from thermal cracking of the gases obtained from the catalytic cracking of petroleum fractions. Another is that obtained from the thermal cracking of petroleum naphthas. Still another is propane. In the case of feed stocks containing a high concentration of ethane, it is desirable to subject the stream to severe cracking conditions to obtain a maximum conversion of ethane to ethylene. Any heavy ends in the cracked product may be removed in known manner, e. g., by distillation.

The crude ethylene stocks obtained in this manner may contain about 10 to 35% ethylene, together with methane and ethane, a small amount of acetylene, and a substantial amount of hydrogen.

Inasmuch as the presence of acetylene is undesirable in the ethylene oxide formation step, it is preferred to remove the acetylene by hydrogenation in the presence of a nickel, iron or palladium catalyst, in known manner. If the amount of acetylene is quite low, e. g., below about 1%, it may be removed together with the hydrogen in the step of catalytically oxidizing the latter.

The step of catalytically oxidizing the hydrogen with air or other oxygen containing gas in the presence of the silver catalyst is carried out at a temperature in the range of about 200 to 235° C. under conditions to remove substantially all the hydrogen gas, with minimum attack of the ethylene.

In an alternative procedure for this oxidation step, a copper chromite catalyst may be used, e. g., one containing 5 to 15% copper and 0.1 to 0.5% chromium, supported on irregular aluminum oxide particles (Aloxite). A typical catalyst of this class may be prepared as follows: 246 g. Cu(NO₃)₂·3H₂O and 11.2 g. Cr(NO₃)₃·9H₂O are mixed in an evaporating dish and heated until the nitrates are dissolved in the water of crystallization. 350 g. of Aloxite of 2-4 mesh size is heated for 2 hours at 120° C., and the solution of mixed nitrates is added thereto. The catalyst mixture is dried over a flame with continuous stirring. The catalyst is then heated over the flame until all the fumes of evolved nitrogen oxides are driven off. The catalyst is activated by heating for 1½ hours at 450° C. in a furnace. With this catalyst a temperature in the range of about 240 to 270° C. is used, also under conditions to give a substantially hydrogen-free gas with minimum attack on the ethylene.

A most important feature of the invention is the removal of the free hydrogen gas from the mixture before it is contacted with the silver catalyst under conditions for the production of ethylene oxide, since the rapid oxidation of free hydrogen under such conditions results in excessive heat evolution, and this is reflected in a temperature rise which in turn promotes the total combustion of ethylene; i. e., a lowering of the selectivity in this step. The ethylene oxide formation step or steps are carried out in the presence of the silver catalyst at a temperature in the range of about 240 to 280 or even to 350° C., desirably at elevated pressures in the range of about 5 to 25 atmospheres gauge, preferably about 8 to 20 atmospheres.

In another embodiment of the invention, a feed gas consisting of the dilute gases from an ethane cracking furnace is employed, having the following composition:

|  | Percent |
| --- | --- |
| Hydrogen | 43.0 |
| Methane | 7.0 |
| Acetylene | 2.2 |
| Ethylene | 37.0 |
| Ethane | 8.4 |
| C₃'s | 2.4 |
|  | 100.0 |

The gas is passed over a hydrogenation catalyst and the acetylene content reduced to essentially zero. After hydrogenation the gas has the following composition:

|  | Percent |
| --- | --- |
| Hyrogen | 40.2 |
| Methane | 7.3 |
| Ethylene | 40.0 |
| Ethane | 10.0 |
| C₃'s | 2.5 |
|  | 100.0 |

This feed gas is then mixed with air and the cycle gas to give a mixture of about 8.4% by volume oxygen, 4.6% ethylene, 4.6% hydrogen, 1.1% ethane, 0.3% C₃'s, and inert gases; and this is passed through a preoxidation zone containing silver catalyst at a temperature of 210° C.

In the alternative procedure, using the above described copper chromite catalyst, the temperature in this step is about 250° C.

The gas emerging from the preoxidizer has the following composition:

|  | Percent |
| --- | --- |
| Hydrogen | 0.1 |
| Ethylene | 4.5 |
| Oxygen | 6.0 |
| Carbon dioxide | 7.1 |
| Saturated hydrocarbon | 4.4 |

The balance being essentially nitrogen with a small amount of water vapor.

The gas was then passed to the oxidation zone at a flow rate of 500 cubic feet per hour, at a temperature of 290° C. under a pressure of 10 atmospheres gauge. The converter comprised a tube 20 feet long and 1 inch in diameter, packed with a catalyst made of silver oxide coated on the inert support. A very small amount of halogen containing inhibitor was added continuously to the feed gases.

The gas leaving the converter had the following composition:

| | Percent |
|---|---|
| Ethylene | 3.0 |
| Oxygen | 4.0 |
| Carbon dioxide | 8.1 |
| Saturated hydrocarbon | 4.4 |
| Ethylene oxide | 1.03 |

The balance being essentially nitrogen with a small amount of water vapor.

The gas was scrubbed with water in a scrubbing tower to remove the ethylene oxide and then was recycled, approximately one-third thereof being purged out of the system to a secondary converter. The ethylene conversion in the secondary converter comprised approximately 50% of the theoretical amount based upon the ethylene feed of 3%.

The overall yield of ethylene oxide from both the primary and secondary converters was 60%, based on ethylene feed, or 36% based on the ethane charged to the cracking furnace. This high yield of ethylene oxide was obtained without subjecting the gaseous stream to expensive ethylene distillation.

*Example 2*

This example is similar to the foregoing example except that the ethylene oxide formation steps were run at 11 atmospheres gauge, a temperature of about 235° C., and a residence time of about 0.585 second, and other conditions and results as set forth in the following table:

| Gases (in vol. percent) | Primary Reactor | Secondary Reactor |
|---|---|---|
| Ethylene at Inlet | 4.96 | 1.65 |
| Ethylene at Outlet | 3.69 | 0.47 |
| Oxygen at Inlet | 5.95 | 6 |
| Ethane at Inlet | 0.44 | 0.37 |
| Ethane at Outlet | 0.441 | 0.37 |
| Chlorinated biphenyl (B. P. 380–460, pref. 400–430° C.) | 0 | 0.001–0.003 |
| Ethylene Oxide at Outlet | 0.922 | 0.77 |
| Ethylene Oxide—Production Rate, lb./hr | 3,841 | 802 |
| Rates (total lb./hr.): | | |
| Ethylene Oxide Production | 4,643 | |
| Ethylene Actual Feed | 4,525 | |
| Ethylene Theoretically Required | 2,957 | |
| Industrial Efficiency— $\frac{\text{Ethylene rate theor. req.}}{\text{Ethylene rate act. feed}} = \frac{2,957}{4,525} = 65.3\%$ | | |

The concentration of ethylene in the primary reactor is especially critical, in order to obtain the optimum yield therein of ethylene oxide relative to ethylene consumed; e. g., about 70% in the above example. If the concentration of ethylene in this feed gas is too low, the yield therein of ethylene oxide is undesirably low, e. g., at 3% ethylene in the feed, the ethylene oxide yield is 65%, on the above basis. If the ethylene concentration in the feed is too high, the yield therein of ethylene oxide also tends to drop to an undesirably low value, e. g., at about 8% ethylene the yield of ethylene oxide drops to 68%, on the above basis.

Comparable results to the foregoing are achieved with various modifications, such as the following. The catalyst support may comprise fused alumina, magnesia, mullite, or carborundum. It may contain about 3 to 30% silver, by weight.

The gaseous mixture fed to the hydrogen burning reactor may contain about 3 to 12% by volume oxygen, 1 to 25% ethylene, 0.2 to 17% hydrogen, and inert gases, desirably up to 8% oxygen, up to 11% hydrogen and up to 17% ethylene, and preferably up to 6% ethylene.

The ethylene gas used may contain up to about 60 moles of paraffins of 1 to 2 carbon atoms, preferably less than 10, per 100 mols of ethylene. The amount of halogen containing inhibitor, preferably chlorinated biphenyl vapor, used to counteract the selectivity lowering effect of the paraffins is in the range of 1 to 300 parts per million of feed gaseous mixture; the higher amounts of paraffins requiring the higher amounts of the chlorinated vapor.

The catalyst employed in the foregoing examples is regarded as particularly effective and desirable. Other silver containing catalysts may be used, however, such as those known to the art. The reaction mixture, temperature, catalyst, and contact time or space velocity of the gaseous mixture are interrelated and suitable combinations thereof are selected to give the desired optimum output and concentration of ethylene oxide in the exit gas.

Inasmuch as the desired formation of ethylene oxide is only one of the many reactions or effects which may occur upon subjecting the mixture of ethylene and oxygen to contact with the catalyst at elevated temperatures, it has been regarded as convenient to refer to the percentage of ethylene consumed in the reaction step relative to the feed as "conversion," and the percentage of ethylene oxide formed relative to the ethylene consumed as "selectivity." The yield of ethylene oxide relative to the ethylene feed is the product of the "selectivity" times the "conversion," e. g., on a mole basis. These percentage ethylene effects and terms may be represented as follows:

Ethylene plus oxygen gives:
  A. Ethylene oxide (desired)
  B. Carbon dioxide and water (not desired)
  C. Unreacted ethylene plus oxygen (not desired)

Selectivity is: $\dfrac{A}{A+B}$

Conversion is: $\dfrac{A+B}{A+B+C}$

Yield is: $\dfrac{A}{A+B+C}$

The foregoing are indicated as major considerations. However, as undesirable effects to be avoided, it may be noted that the ethylene oxide formed might be rearranged to acetaldehyde, which may be an undesirable side product, or it might be further oxidized; and, of course, the ethylene oxide formed can be further oxidized in the system, giving carbon dioxide and water.

It is indeed surprising that ethylene oxide may be produced with such high output efficiencies in accordance with the invention, especially when one keeps in mind the many undesirable effects or side reactions that may occur during or simultaneously with the desired selective oxidation reaction steps.

In view of the foregoing disclosures, variations and modifications thereof will be apparent to one skilled in the art and it is intended to include within the invention all such variations and modifications except as do not come within the scope of the appended claims.

I claim:

1. A process for the preparation of ethylene oxide by the partial oxidation of a feed gaseous mixture comprising about 4.5% ethylene, an approximately equal amount of hydrogen, about 6% oxygen, and inerts, which process comprises contacting said mixture with a first silver catalyst at a temperature in the range of about 210 to 220° C. to give a substantially hydrogen free gaseous mixture comprising about 4.5% ethylene together with inerts, adding an amount of oxygen containing gas to provide in the mixture an amount of oxygen in the range of 5 to 10%, then contacting said gaseous mixture with a second catalyst containing silver at a temperature in the range of 240 to 320° C. to give a gaseous mixture comprising about 1% ethylene oxide together with ethylene and inerts, separating the ethylene oxide therefrom, returning a portion of the resulting gas as recycle to make up the feed gaseous mixture, and discarding the remainder of said gas.

2. A process of claim 1 wherein the discarded gas is contacted with a third catalyst containing silver at a temperature in the range of 240 to 320° C. to give a gaseous mixture containing about 1.5% ethylene, together with ethylene oxide and inerts, separating the ethylene oxide therefrom, and discarding the resulting gas.

3. A process for the preparation of ethylene oxide by the partial oxidation of ethylene from a mixture containing about 40% ethylene and about 40% hydrogen together with inerts, which process comprises adding air and recycle gas thereto and contacting the resulting mixture with a first silver catalyst at a temperature of about 210° C. to selectively oxidize the hydrogen and give a gaseous mixture comprising about 4.5% ethylene, about 0.1% hydrogen, about 6% oxygen, plus inerts, then contacting the latter mixture with a second silver catalyst at a temperature of about 290° C. to give a gaseous mixture comprising about 1% ethylene oxide, about 3% ethylene, about 4% oxygen, and inerts, separating ethylene oxide therefrom, returning a portion of the resulting gas as recycle to the initial feed, contacting the remainder with a third silver catalyst at a temperature of about 290° C. to give a gas containing about 1.5% ethylene, together with ethylene oxide and inerts, separating ethylene oxide therefrom, and discarding the resulting gas.

References Cited in the file of this patent

UNITED STATES PATENTS

| | | |
|---|---|---|
| 1,911,746 | Burke | May 30, 1933 |
| 2,279,469 | Law | Apr. 14, 1942 |
| 2,458,266 | Heider | Jan. 4, 1949 |
| 2,554,459 | Heider | May 22, 1951 |
| 2,600,444 | Sullivan | July 17, 1952 |
| 2,628,965 | Sullivan | Feb. 17, 1953 |

FOREIGN PATENTS

| | | |
|---|---|---|
| 846,574 | France | 1939 |